United States Patent
Lee et al.

(10) Patent No.: US 11,029,411 B2
(45) Date of Patent: Jun. 8, 2021

(54) METHOD AND APPARATUS FOR CORRECTING SATELLITE IMAGING TIME

(71) Applicant: KOREA AEROSPACE RESEARCH INSTITUTE, Daejeon (KR)

(72) Inventors: Seon Ho Lee, Daejeon (KR); Jae Cheol Yoon, Daejeon (KR); Dae Kwan Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 260 days.

(21) Appl. No.: 16/009,008

(22) Filed: Jun. 14, 2018

(65) Prior Publication Data
US 2018/0372882 A1   Dec. 27, 2018

(30) Foreign Application Priority Data

Jun. 27, 2017 (KR) .................. 10-2017-0081031

(51) Int. Cl.
| | | |
|---|---|---|
| G01S 19/25 | (2010.01) | |
| G01S 19/24 | (2010.01) | |
| B64G 1/24 | (2006.01) | |
| G01S 5/02 | (2010.01) | |
| B64G 1/36 | (2006.01) | |
| B64G 1/10 | (2006.01) | |
| G06T 1/00 | (2006.01) | |

(52) U.S. Cl.
CPC ............ *G01S 19/256* (2013.01); *G01S 19/24* (2013.01); *B64G 1/10* (2013.01); *B64G 1/242* (2013.01); *B64G 1/36* (2013.01); *B64G 2001/1028* (2013.01); *G01S 5/0252* (2013.01); *G01S 19/246* (2013.01); *G06T 1/0007* (2013.01); *G06T 2207/10044* (2013.01)

(58) Field of Classification Search
CPC ...... G01S 19/256; G01S 19/24; G01S 19/246; B64G 1/10; B64G 1/36; G06T 1/0007
USPC .......................... 342/357.62, 357.63, 357.64
See application file for complete search history.

(56) References Cited

U.S. PATENT DOCUMENTS

| | | | | |
|---|---|---|---|---|
| 5,043,737 A | * | 8/1991 | Dell-Imagine ............ | G01S 3/42 342/358 |
| 5,267,167 A | * | 11/1993 | Glickman ............... | B64G 1/242 162/206 |
| 5,430,657 A | * | 7/1995 | Kyrtsos ................... | G01S 19/27 342/357.31 |
| 6,219,615 B1 | * | 4/2001 | Chambers ............. | G01S 5/0289 342/357.21 |
| 6,516,252 B2 | * | 2/2003 | Suzuki ................... | H01Q 1/125 342/357.31 |

(Continued)

FOREIGN PATENT DOCUMENTS

| | | |
|---|---|---|
| JP | 2001-116584 | 4/2001 |
| KR | 2003-0046757 | 6/2003 |

*Primary Examiner* — Chuong P Nguyen
(74) *Attorney, Agent, or Firm* — Sandberg Phoenix & von Gontard, P.C.

(57) ABSTRACT

Disclosed is a method and apparatus for correcting a satellite image acquisition time. The method may include receiving, from a ground-based orbit propagator, an initially predicted imaging time, a correction command execution time, and a desired satellite position for imaging, and calculating a waiting time for imaging, a predicted satellite position, a correction time, and a corrected imaging time to correct a satellite image acquisition time.

15 Claims, 6 Drawing Sheets

(56) References Cited

U.S. PATENT DOCUMENTS

| | | | | |
|---|---|---|---|---|
| 6,542,820 B2* | 4/2003 | LaMance | ............... | G01S 19/05 |
| | | | | 342/357.42 |
| 7,327,897 B2* | 2/2008 | Choi | ...................... | G06T 5/006 |
| | | | | 356/139.03 |
| 7,830,304 B2* | 11/2010 | Mattos | .................... | G01S 19/05 |
| | | | | 342/357.23 |
| 8,102,311 B2* | 1/2012 | Mattos | .................... | G01S 19/05 |
| | | | | 342/357.66 |
| 8,260,551 B2* | 9/2012 | Janky | ...................... | G01S 19/07 |
| | | | | 701/469 |
| 8,305,263 B2* | 11/2012 | Cho | ........................ | G01S 19/23 |
| | | | | 342/357.27 |
| 8,384,591 B2* | 2/2013 | Mattos | .................... | G01S 19/27 |
| | | | | 342/357.66 |
| 8,515,670 B2* | 8/2013 | Janky | ...................... | G01S 19/07 |
| | | | | 701/469 |
| 9,210,403 B2* | 12/2015 | Martinerie | ........... | G05D 1/0094 |
| 9,244,177 B2* | 1/2016 | Terashima | .............. | G01S 19/13 |
| 9,354,320 B2* | 5/2016 | Sasahara | ............... | G01S 19/243 |
| 9,366,763 B2* | 6/2016 | Biacs | ................. | G01S 19/23 |
| 10,564,292 B2* | 2/2020 | Rautalin | ................. | G01S 19/27 |
| 10,591,610 B2* | 3/2020 | Pon | ....................... | G01S 19/256 |
| 2010/0103031 A1* | 4/2010 | Onda | .................... | G01S 19/258 |
| | | | | 342/357.58 |
| 2010/0207810 A1* | 8/2010 | Terashima | .............. | G01S 19/13 |
| | | | | 342/357.25 |
| 2013/0124079 A1 | 5/2013 | Olivier et al. | | |
| 2013/0135443 A1 | 5/2013 | Martinerie et al. | | |
| 2014/0278082 A1 | 9/2014 | De Vries et al. | | |
| 2017/0097422 A1* | 4/2017 | Fernandez-Hernandez | ................ | |
| | | | | G01S 19/42 |

\* cited by examiner

METHOD AND APPARATUS FOR CORRECTING SATELLITE IMAGING TIME

CROSS-REFERENCE TO RELATED APPLICATION(S)

This application claims the priority benefit of Korean Patent Application No. 10-2017-0081031 filed on Jun. 27, 2017, in the Korean Intellectual Property Office, the disclosure of which is incorporated herein by reference for all purposes.

BACKGROUND

1. Field

One or more example embodiments relate to a method and apparatus for correcting a satellite image acquisition time, and more particularly, to a method and apparatus for providing time correction such that an optical camera or an imaging radar loaded in a satellite in orbit may capture an image of a desired location.

2. Description of Related Art

An orbiting satellite refers to a satellite that revolves around the Earth in a specific orbit. An orbit propagator may operate both in a ground station and a satellite, and analyze and predict information associated with a position of the satellite in an orbit of revolution.

However, the orbit propagator may have an error in orbit prediction due to limited performance. A ground-based orbit propagator, for example, may generate a relatively large error because it predicts a position of a satellite from the ground. Such an error may amount to approximately 200 meters (m) per day, which may be a hindrance to the satellite in performing its missions. However, a satellite-based orbit propagator may operate inside the satellite, and may thus generate a relatively small error compared to the ground-based orbit propagator.

SUMMARY

According to an exemplary embodiment, there is provided a computer-implemented method of correcting a satellite image acquisition time, the method including receiving, from a ground-based orbit propagator, an initially predicted imaging time, a correction command execution time, and a desired satellite position for imaging; calculating a waiting time for imaging; obtaining a correction point-based satellite position from a satellite positioning system receiver; calculating a predicted satellite position when the waiting time elapses after the correction command execution time; calculating a correction time; and calculating a corrected imaging time.

The step of calculating of the waiting time may include calculating the waiting time based on a difference between the initially predicted imaging time and the correction command execution time.

The satellite positioning system receiver may receive the correction point-based satellite position from one of a global positioning system (GPS), a global navigation satellite system (GLONASS), and a Galileo system.

The step of calculating of the predicted satellite position may include calculating the predicted satellite position using a satellite-based orbit propagator. The step of calculating of the correction time may include calculating the correction time by dividing a difference between the desired satellite position and the predicted satellite position by a satellite velocity. The step of calculating of the correction time may include calculating the correction time by dividing a difference between the desired satellite position and the correction point-based satellite position by the satellite velocity.

The step of calculating of the corrected imaging time may include calculating the corrected imaging time by adding the correction time to the initially predicted imaging time.

According to another exemplary embodiment, there is provided a computer-implemented method of correcting a satellite image acquisition time, the method including receiving a desired satellite position for imaging from a ground-based orbit propagator, receiving an actual satellite position from a satellite positioning system, comparing the desired satellite position and the actual satellite position, and calculating a corrected imaging time by performing extrapolation on the actual satellite position.

According to still another exemplary embodiment, there is provided an apparatus for correcting a satellite image acquisition time, the apparatus including a processor configured to receive, from a ground-based orbit propagator, an initially predicted imaging time, a correction command execution time, and a desired satellite position for imaging, and to calculate a waiting time for imaging, a predicted satellite position when the waiting time elapses after the correction command execution time, a correction time, and a corrected imaging time, and a satellite positioning system receiver configured to receive a correction point-based satellite position from a satellite positioning system.

The processor may be further configured to calculate the waiting time based on a difference between the initially predicted imaging time and the correction command execution time.

The satellite positioning system may be one of a GPS, a GLONASS, and a Galileo system.

The processor may be further configured to calculate the predicted satellite position using a satellite-based orbit propagator. The processor may be further configured to calculate the correction time by dividing a difference between the desired satellite position and the predicted satellite position by a satellite velocity. The processor may be further configured to calculate the correction time by dividing a difference between the desired satellite position and the correction point-based satellite position by the satellite velocity.

The processor may be further configured to calculate the corrected imaging time by adding the correction time to the initially predicted imaging time.

According to yet another exemplary embodiment, there is provided an apparatus for correcting a satellite image acquisition time, the apparatus including a processor configured to receive a desired satellite position for imaging from a ground-based orbit propagator and an actual satellite position from a satellite positioning system, and compare the desired satellite position and the actual satellite position. The processor may be further configured to calculate a corrected imaging time by performing extrapolation on the actual satellite position.

According to further another exemplary embodiment, there is provided a non-transitory computer-readable storage medium storing instructions that, when executed by a processor, cause the processor to perform the above-described method of correcting a satellite imaging acquisition time.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terms is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some exemplary embodiments will be described in detail with reference to the accompanying drawings. Regarding the reference numerals assigned to the elements in the drawings, it should be noted that the same elements will be designated by the same reference numerals, wherever possible, even though they are shown in different drawings.

Description of Terms

A ground-based orbit propagator refers to a satellite orbit predicting device provided in a ground station. The ground-based orbit propagator may include software configured to predict a satellite orbit, in addition to a physical device. A satellite-based orbit propagator refers to a satellite orbit predicting device provided in an orbiting satellite. The satellite-based orbit propagator may include software configured to predict a satellite orbit, in addition to a physical device.

A satellite positioning system is a global navigation satellite system (GNSS) in general. For example, there are a global positioning system (GPS) operated by the United States, a global navigation satellite system (GLONASS) operated by Russia, and a Galileo system operated by the European Union (EU). A satellite positioning system receiver refers to a device configured to receive, from the satellite positioning system, information associated with a position of a satellite, or a satellite position used herein interchangeably with a position of a satellite. An initially predicted imagining time $T_{II}$ refers to a time at which an image of a target is captured, which is initially predicted by the ground-based orbit propagator. The initially predicted imaging time is an image capturing time that is predicted by the ground station without being corrected.

A correction command execution time Tcorrect refers to a time at which a command for correcting an image acquisition time is executed. The correction command execution time needs to be set to be earlier than the initially predicted imaging time because the correcting needs to be performed before an image is obtained.

A waiting time TWait for imaging refers to an amount of time spanning from the correction command execution time to the initially predicted imaging time.

A correction time dT refers to a time to be added to the initially predicted imaging time to correct an image acquisition time.

A corrected imaging time $T_{CI}$ refers to a finally corrected imaging time. An orbiting satellite may capture an image of a location or an object at the corrected imaging time.

A desired satellite position $P_{Desired}$ for imaging refers to a position of a satellite in orbit for the satellite to capture an image of a desired object or location.

A correction point-based satellite position $P_{Correct}$ refers to a position of a satellite in orbit at the correction command execution time. The correction point-based satellite position may be based on information received from the satellite positioning system receiver provided in the satellite.

A predicted satellite position $P_{Predicted}$ refers to a position of a satellite in orbit at the initially predicted imaging time, which is predicted by the satellite-based orbit propagator.

A satellite velocity V refers to a velocity at which a satellite moves along an orbit, and may be received from the satellite positioning system receiver provided in the satellite.

General Satellite Image Acquisition

Figure 1:
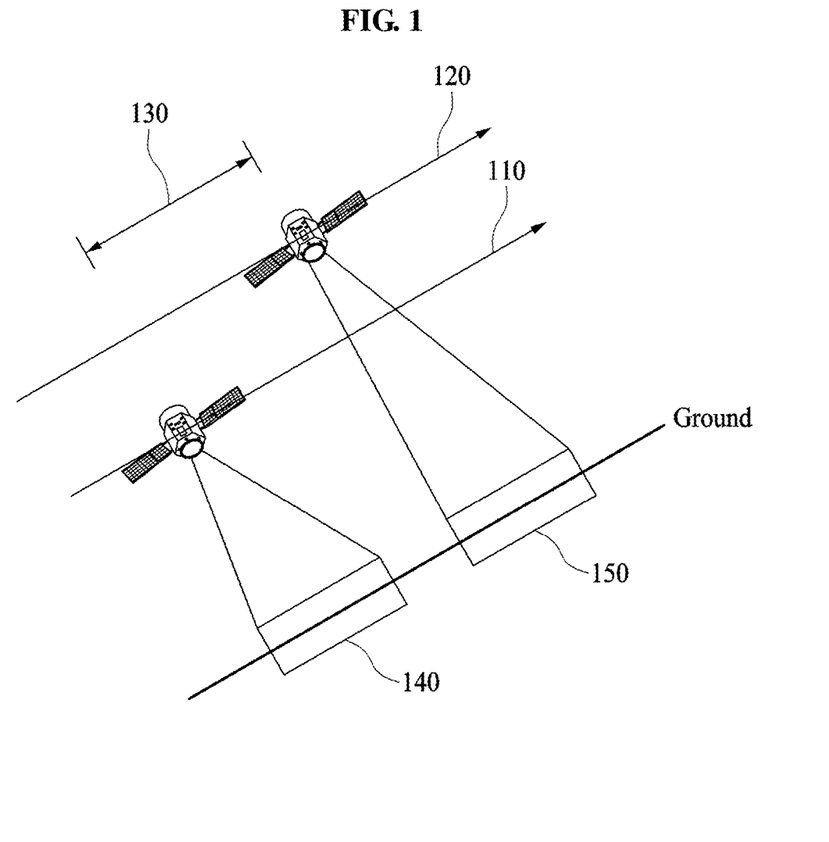
FIG. 1 is a diagram illustrating an example of an area of which a satellite image is obtained according to an exemplary embodiment.

FIG. 1 illustrates an example of an area of which a satellite image is obtained according to an exemplary embodiment. In the example illustrated in FIG. 1, a ground-based predicted orbit 110 of a satellite and an actual orbit 120 of the satellite, and a distance 130 between the actual orbit 120 and the predicted orbit 110 are illustrated. In addition, a desired imaging area 140 and an actual imaging area 150 are also illustrated.

When predicting a position of a satellite moving in orbit from the ground and capturing an image of a desired area, the example illustrated in FIG. 1 may occur. That is, a difference between a position of the satellite in the predicted orbit 110 and a position of the satellite in the actual orbit 120 may occur. This difference may indicate the distance 130 between the actual orbit 120 and the predicted orbit 110. The distance 130 between the actual orbit 120 and the predicted orbit 110 may occur due to a limited performance of an orbit propagator. The orbit propagator may have an error in orbit prediction, which amounts to approximately 200 meters (m) per day.

Thus, when performing imaging, or capturing an image, at an initially predicted imaging time $T_{II}$, an image of a desired area or object may not be captured or obtained. For example, the desired imaging area 140 based on a satellite position predicted at the initially predicted imaging time $T_{II}$ may differ from the actual imaging area 150. Thus, correcting a satellite image acquisition time may be needed. The satellite image acquisition time used herein refers to a time at which a satellite image is to be obtained.

Concept of Satellite Image Acquisition Time Correction

Figure 2:
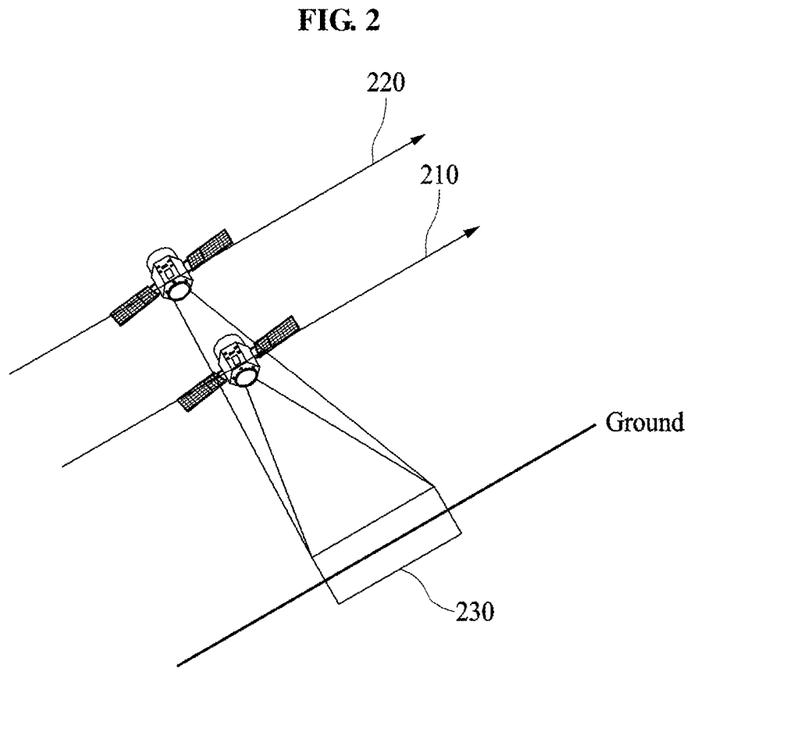
FIG. 2 is a diagram illustrating an example of an area of which an obtained satellite image is to be corrected according to an exemplary embodiment.

FIG. 2 is a diagram illustrating an example of an area of which an obtained satellite image is to be corrected according to an exemplary embodiment. In the example illustrated in FIG. 2, similarly to the example illustrated in FIG. 1, a predicted orbit 210 and an actual orbit 220 of a satellite are illustrated. In addition, an actual imaging area 230 based on correction is also illustrated.

By correcting a satellite image acquisition time, a desired satellite position PDesired for imaging may correspond to the actual imaging area 230. Thus, a desired imaging area may also correspond to the actual imaging area 230. A method of correcting a satellite image acquisition time according to an exemplary embodiment will be described in greater detail with reference to FIG. 3.

Detailed Method of Correcting Satellite Image Acquisition Time

Figure 3:
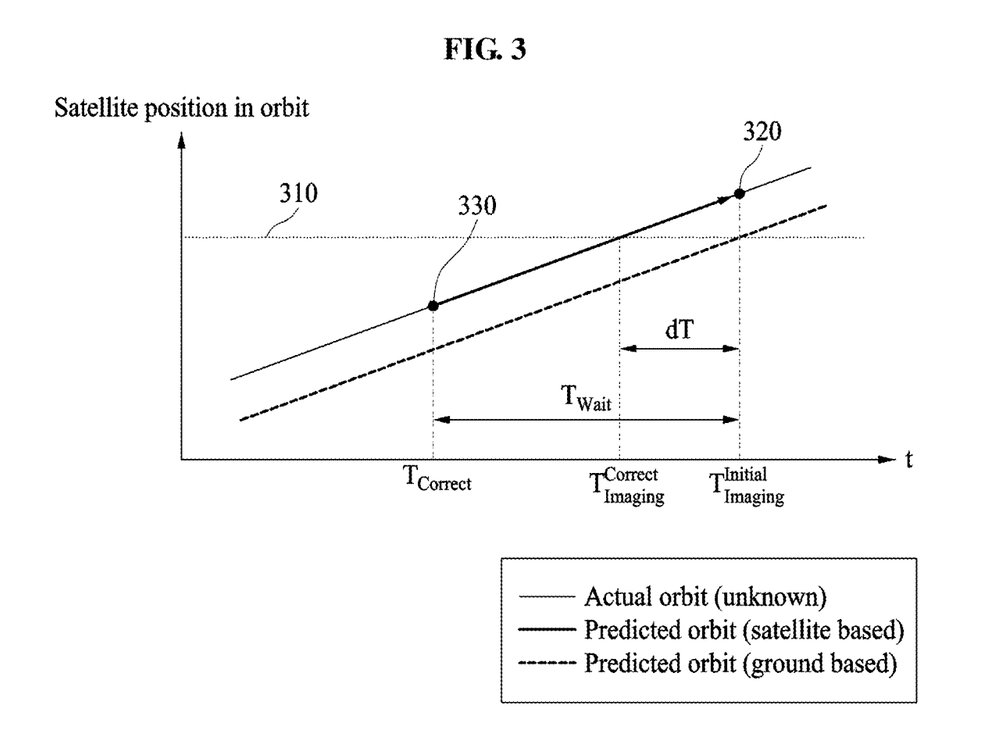
FIG. 3 is a graph illustrating an example of correction of a satellite image acquisition time according to an exemplary embodiment.

FIG. 3 is a graph illustrating an example of correction of a satellite image acquisition time according to an exemplary embodiment. In the example illustrated in FIG. 3, an X axis indicates time and a Y axis indicates a position of a satellite in orbit, which is also referred to herein as a satellite position in orbit. A difference between a predicted orbit and an actual orbit of the satellite may occur in a specific time interval to obtain a satellite image.

In the example illustrated in FIG. 3, an actual orbit of the satellite is indicated by a solid line, and an orbit predicted by a ground-based orbit propagator is indicated by a broken line and an orbit predicted by a satellite-based orbit propagator is indicated by a bold line. The orbit predicted by the satellite-based orbit propagator corresponds to the actual orbit of the satellite.

Hereinafter, a method of correcting a satellite image acquisition time will be described in detail. In the example illustrated in FIG. 3, a desired satellite position $P_{Desired}$ 310 for imaging, which is a satellite position in orbit to capture an image of a desired object or area, is illustrated.

An actual satellite position at an initially predicted imaging time $T_{II}$, a time that is initially predicted by the ground-based orbit propagator to capture an image of a target, is illustrated as a point indicated by 320. It is verified that a difference occurs between the desired satellite position $P_{Desired}$ 310 and the actual satellite position 320.

Herein, a correction command may be performed before the initially predicted imaging time $T_{II}$ by a certain amount of time, for example, a waiting time $T_{Wait}$ for imaging. A point in time at which the correction command is performed or executed is a correction command execution time $T_{Correct}$, which needs to precede the initially predicted imaging time $T_{II}$ because correction needs to be performed before the imaging is performed. Herein, the term "imaging" used herein may include capturing an image of an area or object, and obtaining the image. The waiting time $T_{Wait}$ may be calculated by subtracting the correction command execution time $T_{Correct}$ from the initially predicted imaging time $T_{II}$.

A correction point-based satellite position $P_{Correct}$, or an actual satellite position at the correction command execution time $T_{Correct}$, is illustrated as a point indicated by 330. The correction point-based satellite position $P_{Correct}$ 330 may be received through a satellite positioning system receiver. A difference between the desired satellite position $P_{Desired}$ 310 and a predicted satellite position $P_{Predicted}$ may be calculated, and a correction time dT that is a time interval to correct the difference may be calculated.

In detail, to calculate the correction time dT, the desired satellite position $P_{Desired}$ 310, the predicted satellite position $P_{Predicted}$, and a satellite velocity V may need to be discovered. In the example, the desired satellite position $P_{Desired}$ 310 is given, and the predicted satellite position $P_{Predicted}$ may be calculated from the satellite-based orbit propagator.

In addition, the satellite velocity V may be received from the satellite positioning system receiver provided in the satellite. Using these three values described in the foregoing, the correction time dT may be calculated as represented by Equation 1.

$$dT = (P_{Desired} - P_{Predicted})/V \quad \text{[Equation 1]}$$

The correction time dT may be obtained by dividing, by the satellite velocity V, the difference between the desired satellite position $P_{Desired}$ 310 and the predicted satellite position $P_{Predicted}$.

Using the correction time dT, a corrected imaging time $T_{CI}$ may be obtained. The corrected imaging time $T_{CI}$ may be calculated by adding the correction time dT to the initially predicted imaging time $T_{II}$. The satellite may perform the imaging or capture an image of a desired object or area at the calculated corrected imaging time $T_{CI}$, and may thus capture the image with a high level of accuracy.

The corrected imaging time $T_{CI}$ may be obtained differently. A correction time dT' may be calculated by dividing, by the satellite velocity V, a difference between the desired satellite position $P_{Desired}$ 310 and the correction point-based satellite position $P_{Correct}$ 330.

The correction time dT' may be calculated using the desired satellite position $P_{Desired}$ 310 and the correction point-based satellite position $P_{Correct}$ 330, as represented by Equation 2.

$$dT = (P_{Desired} - P_{Correct})/V \quad \text{[Equation 2]}$$

Dissimilarly to using the correction time dT, a corrected imaging time $T_{CI}$ may be calculated by adding the correction time dT' to the correction command execution time $T_{Correct}$.

The example method may be applied to a case in which an actual satellite position is ahead of a predicted satellite position. However, the same method may also be applied to a case in which the actual satellite position is behind the predicted satellite position.

Another Method of Correcting Satellite Image Acquisition Time

Another method of correcting a satellite image acquisition time will be described hereinafter. The method, to be implemented by a computer, may include receiving a desired satellite position for imaging from a ground-based orbit propagator, receiving an actual satellite position from a satellite positioning system, comparing the desired satellite position and the actual satellite position, and calculating a corrected imaging time by performing extrapolation on the actual satellite position.

In detail, the actual satellite position may be continuously received from the satellite positioning system based on the desired satellite position. For example, a processor may receive an actual satellite position at an interval of one second, and compare the received actual satellite position and the desired satellite position. The processor may calculate the corrected imaging time through extrapolation of an actual satellite position closest to the desired satellite position based on a result of the comparing. In such a case in which an actual satellite position is received at an interval of one second, such an extrapolation may be required to precisely match the actual satellite position to the desired satellite position because a speed of revolution of a satellite is approximately 8 kilometers per second (km/s).

As described above, the processor may receive an actual satellite position at an interval of one second and compare the received actual satellite position and a desired satellite position for imaging, and calculate a corrected imaging time through extrapolation at a position closest to the desired satellite position. An object or device loaded in the satellite, also simply referred to herein as a loaded object, may receive the calculated corrected imaging time and perform imaging at the corrected imaging time.

Physical System for Satellite Image Acquisition

Figure 4:
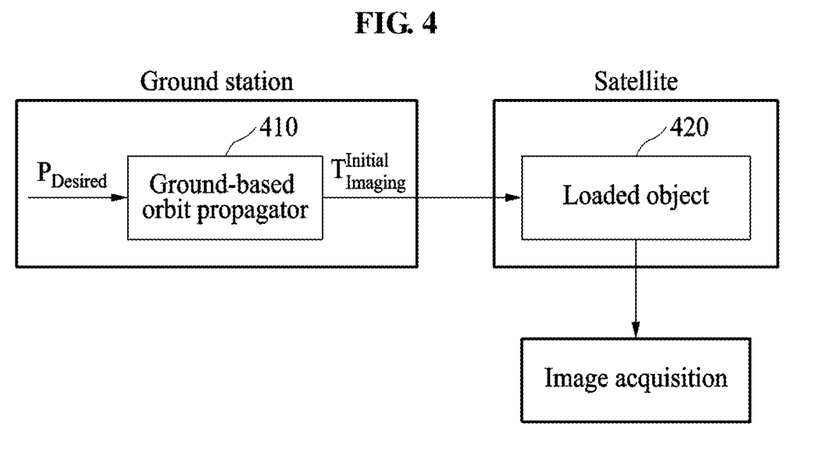
FIG. 4 is a diagram illustrating an example of an existing method of obtaining a satellite image according to an exemplary embodiment.

FIG. 4 is a diagram illustrating an example of an existing method of obtaining a satellite image according to an exemplary embodiment. To obtain a satellite image, a ground station system and a satellite system may be needed. Referring to FIG. 4, a ground-based orbit propagator 410 is present in a ground station, and a loaded object 420 is present in a satellite.

In the ground station, a desired satellite position $P_{Desired}$ for imaging may be received from a user. The desired satellite position $P_{Desired}$ may be input to the ground-based orbit propagator 410, an initially predicted imaging time $T_{II}$ may be output. The initially predicted imaging time $T_{II}$ may be transmitted to the loaded object 420 present in the satellite. The satellite may then obtain an image at the initially predicted imaging time $T_{II}$.

The ground station may predict a position of the satellite in orbit using the ground-based orbit propagator 410, and the satellite may perform imaging using the loaded object 420 at a time predicted by the ground station.

Physical System for Satellite Image Acquisition Time Correction

Figure 5:
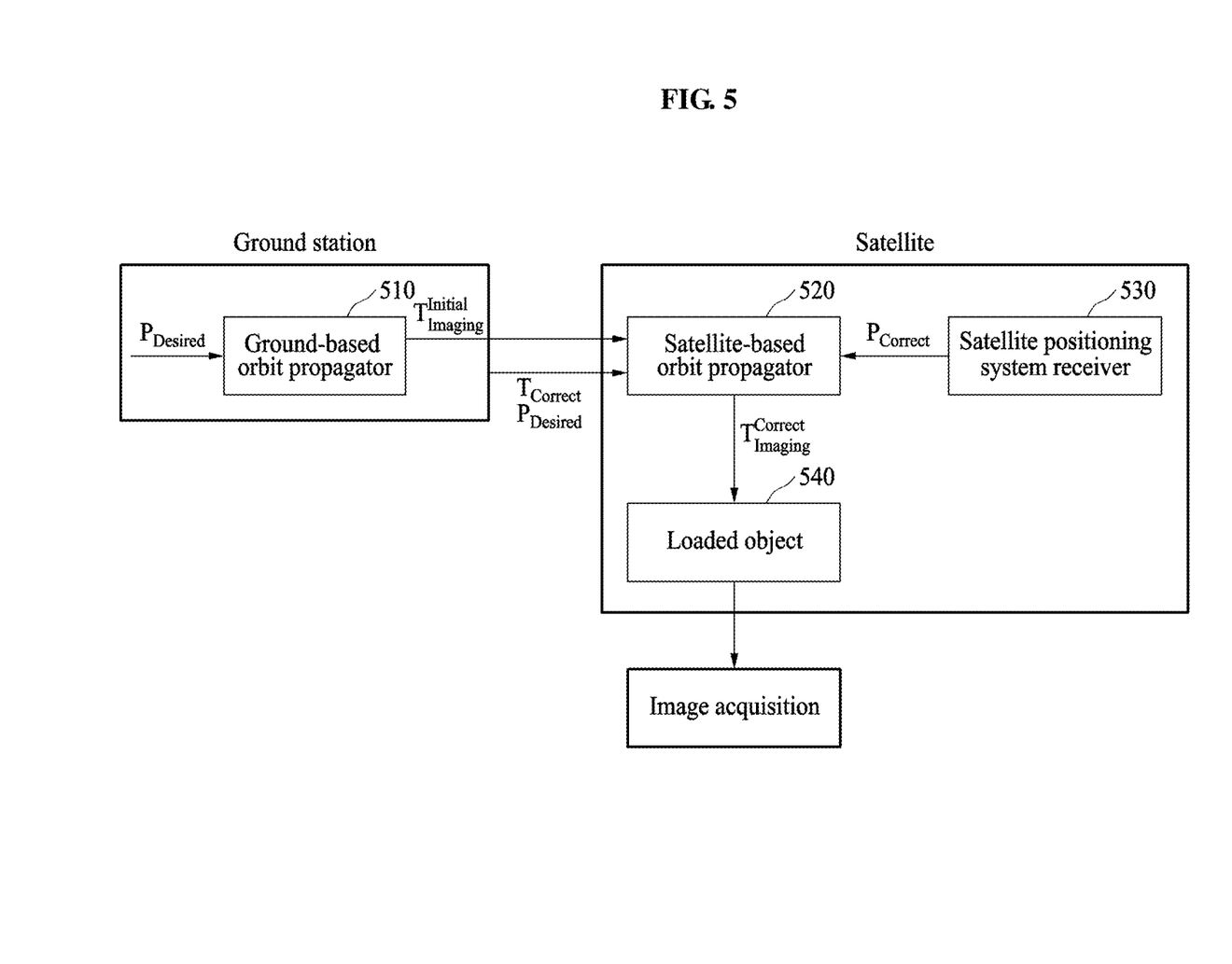
FIG. 5 is a diagram illustrating an example of a method of correcting a satellite image acquisition time according to an exemplary embodiment.

FIG. 5 is a diagram illustrating an example of a suggested method of correcting a satellite image acquisition time according to an exemplary embodiment. Since there is a difference between a satellite position in orbit predicted by a ground station and an actual satellite position in orbit, a method of correcting such a difference may be needed to precisely capture an image of a desired area or target.

The ground station includes a ground-based orbit propagator 510, similarly to the existing method described above with reference to FIG. 4. A satellite includes a satellite-based orbit propagator 520 and a satellite positioning system receiver 530, in addition to a loaded object 540.

In the ground station, a desired satellite position $P_{Desired}$ for imaging may be received from a user. The desired satellite position $P_{Desired}$ may be input to the ground-based orbit propagator 510, and an initially predicted imaging time $T_{II}$ may be output. The initially predicted imaging time $T_{II}$ may be transmitted to the satellite-based orbit propagator 520 in the satellite. The satellite-based orbit propagator 520 may receive a correction command execution time $T_{Correct}$ and the desired satellite position $P_{Desired}$, in addition to the initially predicted imaging time $T_{II}$. In addition, the satellite-based orbit propagator 520 may receive a correction point-based satellite position $P_{Correct}$ from the satellite positioning system receiver 530. The satellite-based orbit propagator 520 may calculate a corrected imaging time $T_{CI}$ using such received information and transmit the calculated corrected imaging time $T_{CI}$ to the loaded object 540. The loaded object 540 may then capture or obtain an image at the corrected imaging time $T_{CI}$.

An operation performed by each component is described above with reference to FIG. 5, and reference may be made to the description provided with reference to FIG. 3 for an algorithm that is internally calculated by the ground-based orbit propagator 510 or the satellite-based orbit propagator 520.

Figure 6:
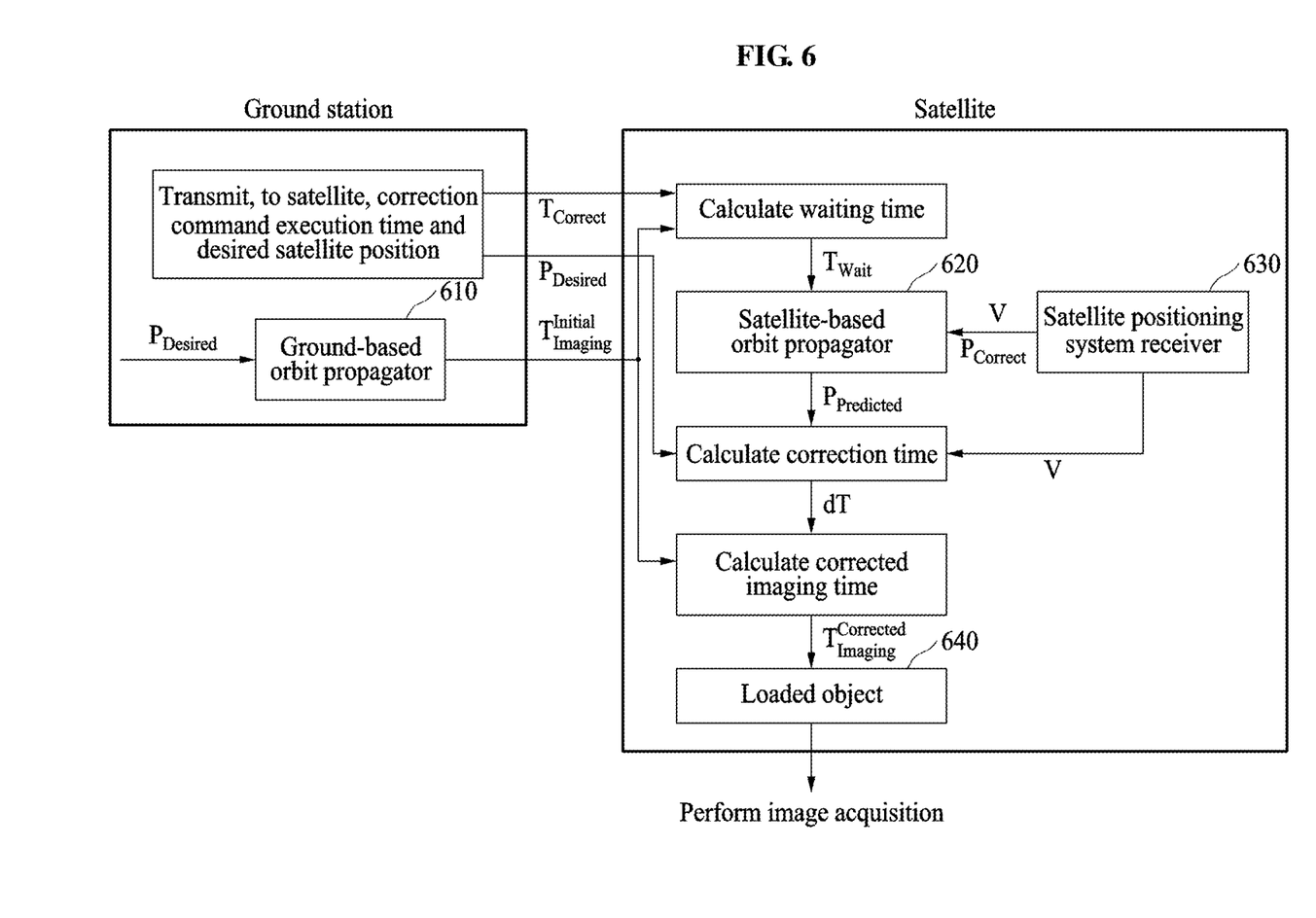
FIG. 6 is a diagram illustrating a detailed example of a method of correcting a satellite image acquisition time according to an exemplary embodiment.

FIG. 6 is a diagram illustrating a detailed example of a method of correcting a satellite image acquisition time according to an exemplary embodiment. Referring to FIG. 6, a system for correcting a satellite image acquisition time includes a ground-based orbit propagator 610 in a ground station, and a satellite-based orbit propagator 620, a satellite positioning system receiver 630, and a loaded object 640 in a satellite.

In the ground station, the ground-based orbit propagator 610 may receive a desired satellite position $P_{Desired}$ for imaging. The ground-based orbit propagator 610 may calculate an initially predicted imaging time $T_{II}$ using the received desired satellite position $P_{Desired}$. The ground station may transmit, to the satellite, a correction command execution time $T_{Correct}$ and the desired satellite position $P_{Desired}$.

The satellite may calculate a waiting time $T_{Wait}$ for imaging using the correction command execution time $T_{Correct}$ and the initially predicted imaging time $T_{II}$. The satellite-based orbit propagator 620 may calculate a predicted satellite position $P_{Predicted}$ using the waiting time $T_{Wait}$ and a correction point-based satellite position $P_{Correct}$ received from the satellite positioning system receiver 630.

A processor may calculate a correction time dT using the predicted satellite position $P_{Predicted}$, the desired satellite position $P_{Desired}$ received from the ground station, and a satellite velocity received from the satellite positioning system receiver 630. The processor may calculate a corrected imaging time $T_{CI}$ using the correction time dT and the initially predicted imaging time $T_{II}$ received from the ground-based orbit propagator 610. The loaded object 640 may thus capture or obtain an image at the corrected imaging time $T_{CI}$.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of correcting a satellite image acquisition time to be implemented by a computer, the method comprising:
receiving, from a ground-based orbit propagator, a desired satellite position for imaging;
receiving, from a ground-based orbit propagator or a satellite-based orbit propagator, an initially predicted imaging time ($T_{II}$) and a correction command execution time ($T_{Correct}$),
calculating a waiting time for imaging;

obtaining a correction point-based satellite position from a satellite positioning system receiver, the correction point-based satellite position being a position of the satellite at the correction command execution time;

calculating a predicted satellite position using the correction point-based satellite position, the predicted satellite position being a position of the satellite at a time at which the waiting time elapses after the correction command execution time;

calculating a correction time; and calculating a corrected imaging time.

2. The method of claim 1, wherein the calculating of the waiting time comprises:

calculating the waiting time based on a difference between the initially predicted imaging time and the correction command execution time.

3. The method of claim 1, wherein the calculating of the predicted satellite position comprises:

calculating the predicted satellite position using a satellite-based orbit propagator.

4. The method of claim 1, wherein the calculating of the correction time comprises:

calculating the correction time by dividing a difference between the desired satellite position and the predicted satellite position by a satellite velocity.

5. The method of claim 1, wherein the calculating of the correction time comprises:

calculating the correction time by dividing a difference between the desired satellite position and the correction point-based satellite position by a satellite velocity.

6. The method of claim 1, wherein the calculating of the corrected imaging time comprises:

calculating the corrected imaging time by adding the correction time to the correction command execution time or the initially predicted imaging time.

7. The method of claim 1, wherein the satellite positioning system receiver is configured to receive the correction point-based satellite position from one of a global positioning system (GPS), a global navigation satellite system (GLONASS), and a Galileo system.

8. An apparatus for correcting a satellite image acquisition time to be implemented by a computer, the apparatus comprising:

a processor configured to:

receive a desired satellite position for imaging from a ground-based orbit propagator, receive an initially predicted imaging time and a correction command execution time from the ground-based orbit propagator or a satellite-based orbit propagator, calculate a waiting time for imaging, calculate a predicted satellite position using a correction point-based satellite position, the predicted satellite position being a position of the satellite at a time at which the waiting time elapses after the correction command execution time, calculate a correction time, and calculate a corrected imaging time; and a satellite positioning system receiver configured to receive the correction point-based satellite position from a satellite positioning system, the correction point-based satellite position being a position of the satellite at the correction command execution time.

9. The apparatus of claim 8, wherein the processor is further configured to calculate the waiting time based on a difference between the initially predicted imaging time and the correction command execution time.

10. The apparatus of claim 8, wherein the processor is further configured to calculate the predicted satellite position using a satellite-based orbit propagator.

11. The apparatus of claim 8, wherein the processor is further configured to calculate the correction time by dividing a difference between the desired satellite position and the predicted satellite position by a satellite velocity.

12. The apparatus of claim 8, wherein the processor is further configured to calculate the correction time by dividing a difference between the desired satellite position and the correction point-based satellite position by a satellite velocity.

13. The apparatus of claim 8, wherein the processor is further configured to calculate the corrected imaging time by adding the correction time to the correction command execution time or the initially predicted imaging time.

14. The apparatus of claim 8, wherein the satellite positioning system is one of a global positioning system (GPS), a global navigation satellite system (GLONASS), and a Galileo system.

15. A non-transitory computer-readable storage medium storing instructions that, when executed by a processor, cause the processor to perform the method of claim 1.

* * * * *